May 1, 1956 J. M. LANDRY 2,743,958
IRRIGATION SYSTEM BY SPRINKLING AND A SPRINKLER DEVICE
Filed June 23, 1952 4 Sheets-Sheet 1

INVENTOR.
JACOBUS M. LANDRY
BY George B White
ATTORNEY

May 1, 1956 J. M. LANDRY 2,743,958
IRRIGATION SYSTEM BY SPRINKLING AND A SPRINKLER DEVICE
Filed June 23, 1952 4 Sheets-Sheet 3

INVENTOR.
JACOBUS M. LANDRY
BY
George B White
ATTORNEY

May 1, 1956  J. M. LANDRY  2,743,958
IRRIGATION SYSTEM BY SPRINKLING AND A SPRINKLER DEVICE
Filed June 23, 1952  4 Sheets-Sheet 4

INVENTOR.
JACOBUS M. LANDRY
BY
ATTORNEY

United States Patent Office 2,743,958
Patented May 1, 1956

2,743,958

IRRIGATION SYSTEM BY SPRINKLING AND A SPRINKLER DEVICE

Jacobus M. Landry, Summerland, British Columbia, Canada

Application June 23, 1952, Serial No. 295,080

13 Claims. (Cl. 299—18)

This invention relates to an irrigation system by sprinkling and a sprinkler device.

The primary object of this invention is to provide an irrigation system and a sprinkler device whereby uniform and comparatively low precipitation on a big area may be accomplished so that the precipitation is substantially even under all circumstances, for instance, in the case of high wind.

Another object of the invention is to provide a sprinkler system and sprinkler device whereby a sectional piping system is so arranged as to permit the individual lining up or shifting of the sprinklers in series on a strip to cover comparatively large area, and wherein the radius of the sprinkling is such in relation to the shifting or spacing of the sprinkler that all the areas around the sprinklers and the sprinkling system are provided with the uniform precipitation.

Another object of the invention is to provide a sprinkling system and a sprinkler device which automatically turns the sprinkling spray a complete revolution at the predetermined rate so as to accomplish the uniform precipitation over the entire area covered by the sprinkling system.

Another object of the invention is to provide a sprinkling device which can be easily inserted in a sprinkling system and shifted in sequence or series to completely cover a predetermined strip of the area and in which sprinkler device the rotating of the sprinkler is automatically accomplished at a predetermined variable rate and in which a device is provided to regulate the speed of the sprinkler movement over various sections of the circle of its rotation in such manner as to compensate for overlapping of the areas on which the sprinkler pours the water for uniform overall precipitation.

Another object of the invention is to provide a sprinkler device which is rotatable on the end of a pipe or conduit and in which the offset of the sprinkling nozzle causes the sprinkling jet to exert a moment for the rotation of the sprinkler, which is controlled by a worm and gear mechanism and by a device operated by the sprinkling water spray itself for intermittently allowing the turning of the nozzle on predetermined arcs.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figures 1, 2, 3, 4:
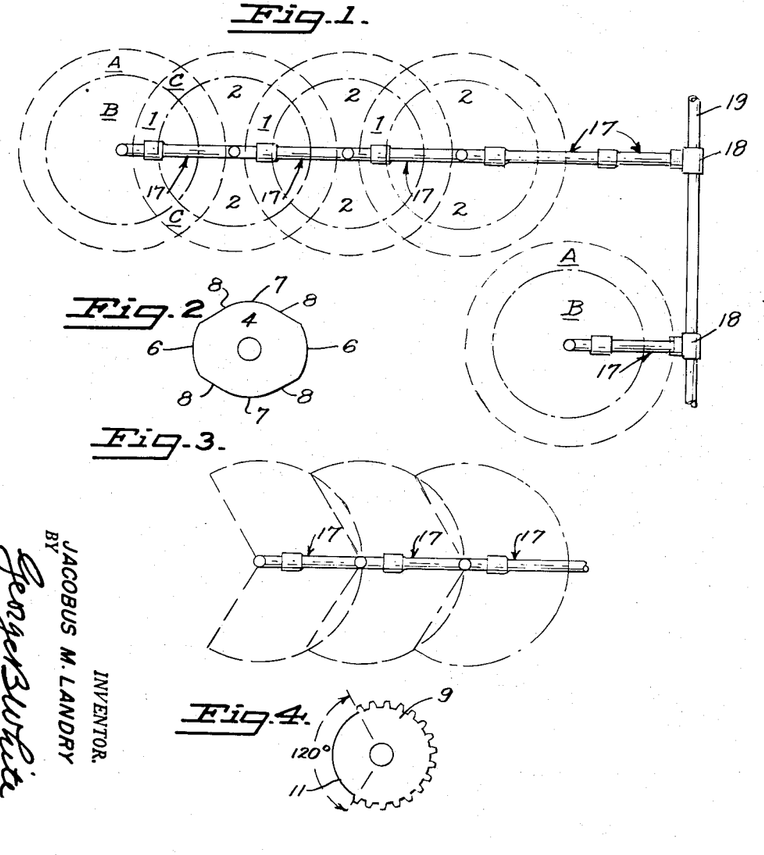
Fig. 1 is a diagrammatic plan view of my sprinkling system.
Fig. 2 is a plan view of the cam controlling variation of rate of turning of sprinkler.
Fig. 3 is a diagrammatic plan view of my sprinkling system with sector skip in the sprinkling circle.
Fig. 4 is a plan view of the gear controlling the sector skip.

In carrying out the system or method of irrigation by sprinklers I use variable speed rotating or turning sprinklers each covering a substantially circular area and arrange or shift the sprinklers in series in such overlapping relation as to compensate for the variation in the precipitation of said area by each sprinkler so as to accomplish uniform precipitation over the entire area. In rotating sprinklers usually a larger amount of water is deposited in a ring at the outer periphery of the circular area sprinkled. There is a central circle about the sprinkler which receives a lesser amount of precipitation. Consequently the spacing or shifting of the sprinklers is on a line so arranged and the speed of sprinklers is so regulated as to compensate for this variance in the precipitation. This form of arrangement is illustrated in Fig. 1 of the drawings wherein the ring of higher precipitation is denoted by the letter A, the central area of lesser precipitation by the letter B. The centers of the sprinkler positions in the series are spaced approximately at or a slightly larger distance than the radius of sprinkling. In view of the fact that rings of higher precipitation of the adjacent circular areas of sprinkling also overlap, the speed variation of the sprinklers is so adjusted and regulated as to decrease the precipitation by increasing the speed of movement in the segments C at overlapping areas of higher precipitation. Consequently in one circle of sprinkling irrigation there will be two areas in which the speed of the sprinkler movement is at full speed of sprinkler movement at about twice as fast as required for the desired precipitation. These areas are substantially overlapping the adjacent circle of sprinkling so that together the overlapping areas obtain the full predetermined amount of precipitation. These two areas 1 are diametrically opposite in each circle of sprinkling on the diameter longitudinal with respect to the strip sprinkled. Diametrically opposite areas 2 on a diameter at right angles to the first mentioned areas 1 are sprinkled at a slower rate of speed, namely at about one half of the speed of the movements of the sprinkler over the areas 1 so as to produce precipitation in the areas 2 approximately, twice as heavy than a single sprinkling in areas 1. In segmental areas C between the full precipitation areas 2 and the half precipitation areas 1 there is a transitory graduated arrangement for gradually varying the speed of shifting in the segments between the areas 1 and the areas 2.

As an illustration for accomplishing such speed and precipitation regulation by the rotating sprinkler, reference is had to Fig. 2, namely a cam 4 the shape of which is such that the outer segments 6 thereof hold the sprinkler rotating control in a position for minimum of turning upon each actuation and thereby correspondingly reducing the speed of rotation or turning of the sprinkler over the parts of the circle corresponding to cam segments 6. On the smaller diameter segments 7 on the cam 4 the control device for turning the sprinkler is allowed to give a larger turn upon each movement and thereby increases the speed of movement over the areas corresponding to said cam segments 7 and thereby reduces the precipitation during the travel of the sprinklers over the area corresponding to said cam segments 7. The shoulders 8 of the cam 4 provide for the control of said sprinkler turning so as to vary gradually the amount of turning of each actuation over the area of travel corresponding to said cam shoulders 8 between the outer cam segments 6 and the higher speed cam segments 7. The control mechanism which is controlled by the cam 4 will be hereinafter described.

Another embodiment of the method to accomplish uniform precipitation is illustrated in Fig. 3, in which the series of sprinklers, or the shifting of the sprinkler positions on a strip or line, is again spaced on centers at a distance from one another approximately equal to the radius of sprinkling. In this form the sprinkler is permitted to jump or skip over about a 120° of the circle of its rotation and the sprinkler positions are so spaced in series that this 120° cut off on the sprinkler action is facing in the direction of the next preceding circle of irrigation.

More than one nozzle may be used so that one nozzle would cover the outer circle or ring A while another nozzle would cover the central area B, the two nozzles rotating together with the sprinkler. The control for such skipping at 120° in the turning of the sprinkler is accomplished by a worm gear 9 in the actuating mechanism on which the teeth are omitted or stripped at a 120° segment 11 of its periphery so that as the turning mechanism rides on the gear, it is left free to quickly skip over the toothless segment 11 as turned by forces available in the sprinkler device until the turning mechanism is reengaged with the toothed part of the gear 9 again to move at a predetermined even rate of speed.

In both types of sprinkler controls the rotating sprinkler device 12 is supported on a sprinkler pipe 13 which has suitable tripod legs 14 thereon so as to support the pipe itself stationary. This sprinkler device 12 is rotatable on the sprinkler pipe and the nozzle or nozzles 16 are offset to one side of the center of the pivot of the sprinkler device on the sprinkler pipe so as to impart a turning moment to the sprinkler device for turning the sprinkler device in accordance with the controls to be hereinafter described.

Figure 5:
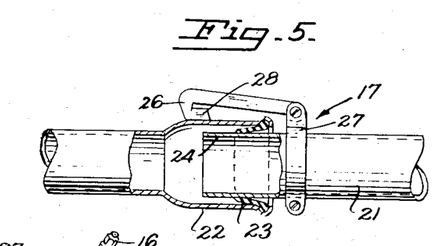
Fig. 5 is a partly sectional fragmental view of the connected ends of the interchangeable conduits in my system.

The positioning of the sprinkler devices along a predetermined strip is accomplished by sectional conduit assemblies 17 detachably connected to suitable outlets 18 of a supply pipe 19. Each of the conduit assemblies 17 is made of a plurality of conduit sections 21. Each section 21 has on one end thereof an enlarged socket 22 with a resilient composition or rubber lining 23 turned inwardly of the socket 22 and secured at the outer end of socket 22 so that when the other end 24 of the next section 21 is inserted into said lining 23 and the water is turned on the pressure behind the lining 23 firmly seals and tightens the coupling between the adjacent sections 21. To prevent accidental disengagement of the sections 21 I provide a hook 26 which hook is pivoted on the plain end 24 of each section, for instance on a lug or collar 27, and is adapted to hook over a keeper 28 on the exterior of the adjacent socket 22. Each conduit section is preferably equal to the radius of the sprinkler irrigation of a sprinkler, or the conduit sections are of such length that a part of the assembly is equal to said radius of sprinkler irrigation thereby allowing the removal of a length of the conduit assembly approximately equal to said radius of irrigation or the addition of the same length for shifting the sprinkler after each complete revolution in the pattern heretofore described. In the event several sprinklers are used on the same line suitable outlets may be provided on the conduit assembly for connection to the respective sprinklers.

The preferable method of carrying out the irrigation with my variable speed sprinklers includes a pair of sprinklers connected respectively at the ends of conduit assemblies 17 on adjacent outlets 18 which outlets are spaced from one another substantially the distance equal to the diameter of sprinkling area from the sprinkler. As shown in Fig. 1 and Fig. 2, when two sprinklers are used on two adjacent outlets 18, then one of the sprinklers is located at the end of the full length conduit assembly 17 on one outlet 18 while the other sprinkler is used on the first section of the conduit assembly substantially at the sprinkling radius distance from the supply line or other outlet 18. Upon simultaneous operation of both sprinklers a circular area is irrigated near the supply pipe 19 and another circular area parallel with it spaced at the maximum distance from the supply pipe 19. After the desired precipitation is completed over a given circle by the sprinklers, a section 21 or a radial length portion is removed from the longer conduit assembly 17 and is added to the shorter conduit assembly so that the outer or farther sprinkler is shifted toward the supply pipe 19 by said radial distance and the inner or closer sprinkler is shifted outwardly away from the supply pipe 19 by said radial distance and thus parallel strips of areas on said parallel lines are irrigated seriatim until the relative position of the sprinklers on the parallel conduit assemblies is reversed from the initial relative position. Thereafter the conduit assemblies 17 are connected to the next pair of outlets 18 and the operation is repeated. Two or more pairs of such conduit assemblies 17 and sprinklers may be utilized simultaneously and thereby reduce the time of sprinkling a large area. The rate of rotation or turning of each sprinkler is comparatively slow so as to accomplish the required precipitation. For instance, in practice with ⅜ inch nozzles and two shiftings a day 0.9 acre is irrigated daily or 19 acres in a three weeks period which in some localities at 65 pressure and 76 gallons per minute will give 4.2 inches of precipitation. In this example 11½ hour shifts are performed. For sprinklers used in the system would cover the acreage in half the time, or by using double the total length of conduit assemblies the system would cover double the acreage or 38 acres in the same period.

Figure 6:
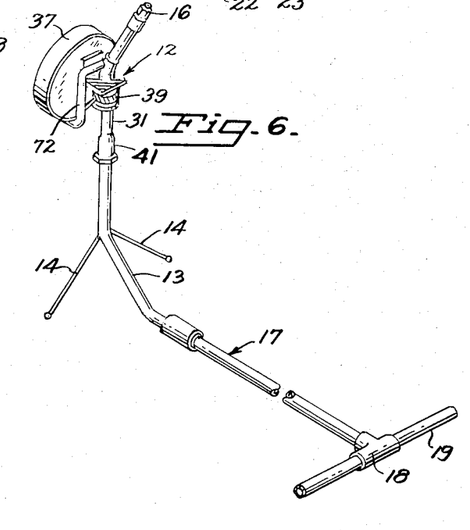
Fig. 6 is a perspective view of the sprinkler arrangement in my system.
Figure 7:
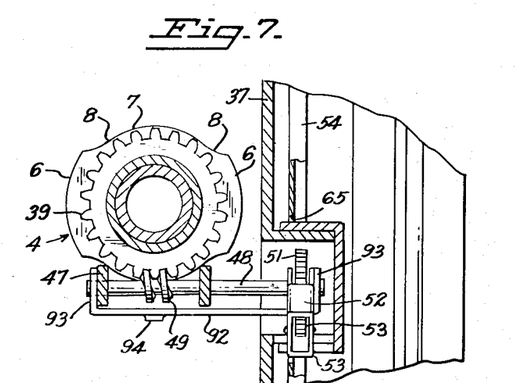
Fig. 7 is a fragmental sectional plan view of the intermittent sprinkler turning transmission.
Figures 11, 12:
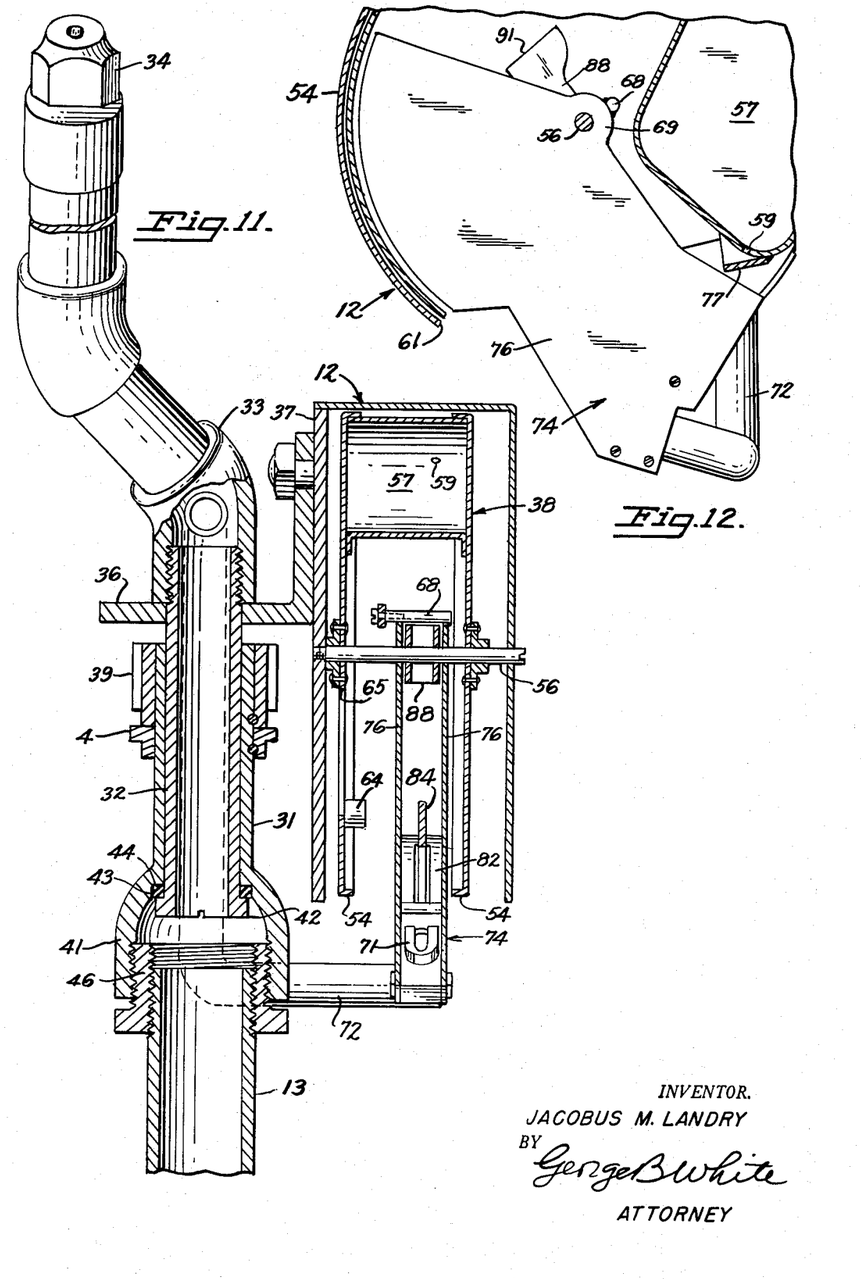
Fig. 11 is a partly sectional view of the sprinkler mounting and sprinkler turning mechanism.
Fig. 12 is a fragmental view of the fixed casing structure on the auxiliary sprinkler within the rotating drum.

In my sprinkler device 12 a supporting pipe section 31 has a rotatable tube 32 therein on the top of which rotatable tube is mounted a nozzle conduit 33 curved so that the nozzle 34 at its outer end is at angle and is offset to one side relatively to the center of rotation of the tube 32. On the nozzle conduit 33 and near the top of the pipe support 31 is a bracket 36 on which is fixed a generally cylindrical drum casing 37 in which a water operated turning device 38 is mounted so as to operate and ride on a worm gear 39 which latter is fixed to the exterior of the top of the pipe support 31. The lower end of the pipe support 31 has an enlarged socket 41 to accommodate a bearing head 42 on the lower end of the rotating tube 32. A compressible packing washer 43 is arranged around the tube 32 on the top of the bearing head 42 spaced from the inner end of the socket 41 so as to be pressed against a seat 44 on the inner end of the socket 41 when the water pressure pushes the rotatable unit and the nozzle conduit upwardly. In the outer end of the socket 41 is threaded a reducer 46 the internal threads of which latter are threaded on the end 31 of the sprinkler pipe 13 heretofore described.

From the bracket 36 depends a bearing bracket 47 extended along the outside of the worm gear 39. In the bracket 47 and in a bearing casing 50 inside the casing 37 is journalled a wormshaft 48 on which is fixed a worm 49 in mesh with the worm gear 39 so that as the nozzle conduit 33 and the drum casing 37 are turned by the turning of the worm 49 the latter rides on the worm gear 39 around the pipe support 31 as a pivot.

On the inner end of the wormshaft 48 and within the bearing casing 50 is a ratchet gear 51. On the wormshaft 48 and around the ratchet gear 51 is swingably journalled a pawl yoke 52 in which pawl yoke 52 is pivoted a pawl 53 in engagement with the periphery of the ratchet gear 51 so that when pawl yoke 52 is pushed in a clockwise direction viewing Fig. 14 it turns the ratchet gear 51 and thereby turns the wormshaft 48 and the worm 49 for the intermittent turning of the drum casing 37, and the nozzle conduit 33 therewith, around the wormgear 39. The pawl yoke 52 is freely swingable on the wormshaft 48 so that after each actuation it drops back to an initial position for the next intermittent operation.

The pawl yoke 52 and the pawl 53 are intermittently actuated by the action of an auxiliary sprinkling water jet. For this purpose a rotating drum 54 is journalled in the drum casing 37 and on a central shaft 56 fixed in the opposite walls of the drum casing 37. The rotating drum 54 has a bucket 57 formed near its periphery. The periphery of the rotating drum 54 is cut away over about one half of its periphery on a diameter generally in line with the bottom of the bucket 57. This bucket has an intake port 58 adjacent the inner periphery of the rotating drum 54 on the side facing in the direction of said auxiliary sprinkling water jet, and an outlet port 59 on its opposite or bottom side also near the outer periphery of the rotating drum 54. The drum casing 37 also has a peripheral opening 61 formed by cutting away its periphery adjacent the lower portion of the drum casing 37 viewing Fig. 8, which is aligned with the initial position of the cutaway half of the rotating drum periphery. An arcuate baffle 62 is fixed in the drum casing 37 spaced from the periphery of said drum casing 37 and extended from an edge of the peripheral opening 61 toward the initial position of the bucket 57 so that in the initial position of the bucket 57, as shown in Fig. 9, the inner or upper end of the arcuate baffle 62 projects into the intake port 58 of said bucket 57. A movable baffle 63 extends in continuation of the outer or lower portion of the arcuate baffle 62 outwardly through the drum opening 61 for the purpose of guiding said auxiliary jet or stream of water to said arcuate baffle 62 which latter guides the stream of water by centrifugal force into the bucket 57 so that the stream or jet of water forces the bucket 57 from the initial position, shown in Fig. 14, into the full or turned position, shown in Fig. 13. A pawl actuating abutment 64 on the side of the rotating drum 54 is in registry with the pawl yoke 52 so that as the bucket 57 is forced toward the position shown in Fig. 8 and rotates the rotating drum 54, the abutment 64 pushes the pawl yoke 52 in a clockwise direction, viewing Fig. 14, and thereby pushes the pawl 53 so as to rotate the ratchet gear 51 and the worm shaft 48 and worm 49 therewith for a predetermined angle of shifting of the drum casing 37 and the nozzle conduit 33 therewith, thereby shifting the direction of the discharge of the sprinkling jets. An elongated arcuate opening 65 in the side of the drum 54 clears the pawl mechanism so as to permit the oscillation of the drum 54 relatively to said pawl and ratchet mechanism.

Figures 13, 14:
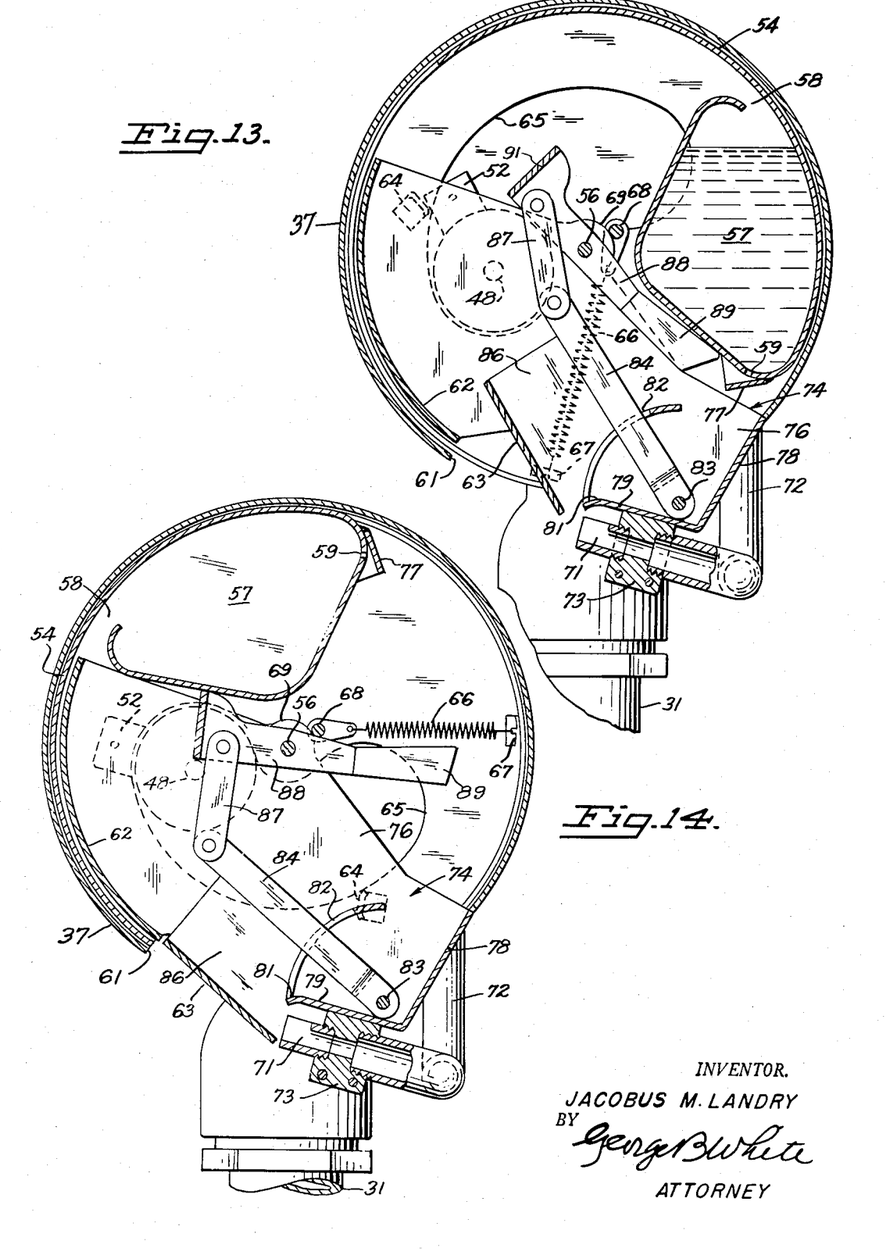
Fig. 13 is a sectional view of the jet operated turning device in turned position.
Fig. 14 is a sectional view of said jet operated turning device in the initial position.

The rotating drum 54 remains in said rotated position of Fig. 13 for the period required for the water to escape from the bucket 57 through the outlet port 59. A coil spring 66 is connected at one end thereof to a lug 67 on the side of the rotating drum 54 in the same space where the abutment 64 is located, and at the other end to a fixed anchor pin 68, which latter is offset to one side of the fixed central shaft 56 and is fixedly held in said offset position by ears 69 extended from the top of a fixed casing 74. The anchor pin 68 is offset toward the rotated position of the bucket 57 in the position shown in Fig. 14, so that in the initial position of the rotating drum 54, as shown in Fig. 14, the lug 67 is the closest to the anchor pin 68 and the coil spring 66 is contracted. When the rotating drum 54 is rotated in a clockwise direction, from the position shown in Fig. 14 to the position shown in Fig. 13, the lug 67 shifts with the rotating drum 54 to the position shown in Fig. 13 and thereby expands the tension spring 66 and holds it under tension. After the water from the bucket 57 is drained the coil spring 66 exerts the eccentric leverage for turning the rotating drum 54 in a contraclockwise direction, viewing Fig. 13, and thereby returns the rotating drum 54 to its initial position shown in Fig. 14. Upon the next operation by the auxiliary sprinkling jet against and into the bucket 57 the rotating drum 54 is again turned in a clockwise direction for the next operation of the pawl 53 on the ratchet gear 51 as heretofore described. In this manner an intermittent operation of the ratchet gear 51 is accomplished for the intermittent turning movement of the nozzle at intervals determined by the length of time required for the water to escape from the bucket 57 through the outlet port 59.

In order to permit the return of the rotating drum 54 to its initial position the movable baffle 63 is shifted into an out of way position at the time when the bucket is filled or moved and after the rotating drum 54 has been rotated through the pawl operating position, and said movable baffle 63 is returned into alignment with the arcuate baffle 62 when the rotating drum 64 is returned to its initial position shown in Fig. 14. For this operation a mechanism is anchored upon an auxiliary nozzle 71. This auxiliary nozzle 71 is arranged at an angle generally tangential to the periphery of the drum casing 37 and is supported on an auxiliary nozzle pipe 72 which extends upwardly outside of the drum casing 37 to the main nozzle conduit 33 and it is connected to the side of said nozzle conduit 33 so as to conduct water under pressure to the auxiliary nozzle 71. The angle of the auxiliary nozzle 71 with respect to the ground is smaller than that of the main nozzle 34 so that the auxiliary nozzle 71, when unobstructed by the movable baffle 63 sprinkles a jet of water substantially into the area B which obtains less of the water from the main nozzle 34 and thereby aids in equalizing the precipitation upon the areas sprinkled.

On the auxiliary nozzle 71 is a fixed anchor bracket 73 for the purpose of supporting a fixed casing 74. This casing 74 has parallel walls 76 which extend from the auxiliary nozzle 71 generally to the fixed drum shaft or central shaft 56 and is also secured thereon. The width of this casing 74 is considerably less than that of the rotating drum 54 so that the latter straddles the fixed casing 74 and moves along the opposite sides thereof.

Figure 8:
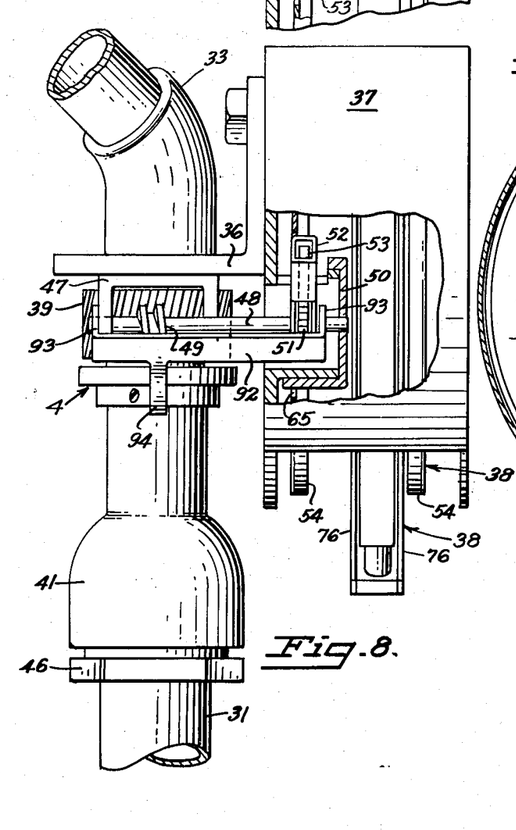
Fig. 8 is a partly sectional view of sprinkler turning device.
Figure 9:
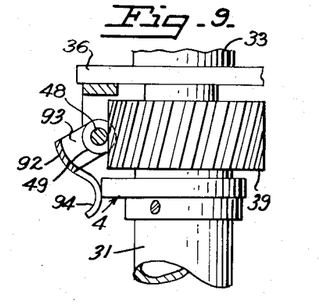
Fig. 9 is a partly sectional view of the speed varying cam control connection of the sprinkler device.
Figure 10:
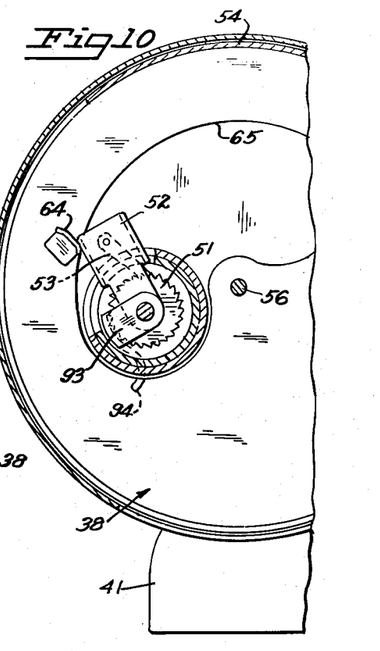
Fig. 10 is a sectional view of the ratchet mechanism in the drum for rotating the sprinkler.

The space between the walls 76 of the fixed casing 74 is opened at the top and is aligned with the outlet port 59 on the bottom of the bucket 57 in the filled position, as shown in Fig. 8, so that the water drips from said outlet port 59 onto a lip 77 and then into the space between the casing wall 76. The outer end of the space between the casing walls 76 is covered by an end wall 78 which extends from the upper edge of the drum casing opening to the auxiliary nozzle 71. A bottom 79 closes the space between the casing wall 76 along the auxiliary nozzle 71 and it terminates in a downwardly curving lip 81 to direct the water into the auxiliary jet or stream issuing from the auxiliary nozzle 71. Inside of the fixed casing 74 are a pair of transverse curved guides 82 which extend upwardly from the lip 81 to a point spaced from the open top of the casing 74 and from the outlet port 59 so that the water dripping from the outlet port 59 is confined in the lower portion of the fixed casing 74 and it flows out at the casing lip 81 at the outlet orifice of the auxiliary nozzle 71.

In the lower outer corner of the fixed casing 74 is a pivot 83 on which is pivoted a lever 84 which latter extends between the guides 82 upwardly and inwardly of the drum casing 37 toward the central shaft 56. The movable baffle 63 is connected by side walls 86 to the part of the lever 84 beyond and above the arcuate guides 82 so that when the lever 84 is swung upwardly, or in a clockwise direction viewing Fig. 14, then the movable baffle 63 is shifted therewith into the upward position and out of the way of the auxiliary nozzle 71 permitting the jet or stream from said auxiliary nozzle to be discharged over the ground. When the lever 84 is shifted back downwardly from the position shown in Fig. 13 to the position shown in Fig. 14, then the movable baffle 63 is shifted downwardly into alignment with the arcuate baffle 62 under the outlet of the auxiliary nozzle 71, as shown in Fig. 9, so that the jet issuing from the auxiliary nozzle 71 is directed into said arcuate baffle 62 and into the bucket 57 as heretofore described. The upper or inner end of the lever 84 is connected to a link 87 which link is pivoted at its other end to an end of a setting lever 88 under the bucket 57. The setting lever 88 is journalled on the central shaft 56. On the other end of the setting lever 88 on the other side of the central shaft 56 is a counterweight 89 which holds the setting lever 88 in the tripped position shown in Fig. 13 until the bucket 57 is swung back to its initial position shown in Fig. 13 and strikes the projection 91 on the first end of the setting lever 88 so as to reset said lever and also to push downwardly the link 87 and lever 84 and return the movable baffle 63 into the lower jet receiving position shown in Fig. 13. In this manner the jet flow into the bucket 57 is so controlled that it cannot commence until after the bucket 57 has been returned to its initial position as shown in Fig. 13.

In operation as the bucket 57 is pushed by the auxiliary jet into the position shown in Fig. 13 it strikes the counterweight 89 and pulls the first end of the setting lever 88 in a clockwise direction thereby pulls the link 87 and turns the lever 84 in a clockwise direction viewing Fig. 14 to shift the movable baffle 63 into the out of way position. After the bucket 57 empties and the coil spring 66 returns the bucket 57 and the rotating drum 54 to its initial position shown in Fig. 14 in a contraclockwise direction, then the bucket 57 strikes said projection 91 and pushes the link 87 and the lever 84 downwardly for pushing the movable baffle 63 into said aligned position for the next turning operation as heretofore described.

For variable speed of turning of the nozzle and therefore varying amount of water sprinkled on a segment of area, the pawl action is regulated by an automatic adjusting device coacting with the cam 4 to determine the backstop or stroke of the pawl yoke 52. A yoke 92 is extended alongside and outside of the worm 49 and into the bearing casing 50 and has its ends 93 loosely journalled on the wormshaft 48. From the yoke 92 extends downwardly a cam follower 94 which is so curved that its lower end rides on the periphery of the cam 4. The cam 4 is fixed on the pipe support 31 under the worm gear 39 so that the projecting or full precipitation outer segments 6 thereof are substantially under the worm 49 and under the yoke 92. The cam follower 94 extends so that it is permitted to swing in accordance with the cam periphery. The cam follower rests against the periphery of the cam 4 by gravity. The inner end of the yoke 92 is below the pawl yoke 52 outside of the periphery of the ratchet gear 51. As the pawl yoke 52 returns by gravity to its initial position, it rests upon cam follower yoke 92 which determines the initial position of the pawl 53 with respect to the ratchet gear 51 and thereby determines the number of teeth bypassed by the pawl 53 and the degree of turn of the ratchet gear 51. In other words, when the cam follower 94 is on the outer segment 6 of the cam 4 the follower yoke 92 is higher with respect to the periphery of the ratchet gear 51 and the pawl yoke 52 is stopped in its return movement in a higher position thereby giving shorter turn to the ratchet gear 51 on the next actuation. In this position the turning of the nozzle device is at a slower rate and therefore the total amount of water discharged over segment of the ground is greater while the cam follower 94 rides on the outer segment 6 of the cam 4. As the cam follower 94 follows the inclined shoulder 8, the initial position of the pawl yoke 52 varies correspondingly and the pawl travel also varies, until the cam follower 94 rides on the inner segments 7 in which position the pawl yoke 52 is in its lowest position with respect to the ratchet gear 51 and thus the pawl yoke 52 is permitted to drop its full stroke after each operation and thereby give the maximum turn to the ratchet gear at each intermittent operation and correspondingly turn the nozzle device at a quicker rate. In this manner the degree of rotation of the nozzle is regulated in accordance with the required precipitation over the various segments of the circular area irrigated as described in connection with the system shown in Fig. 1.

For the purpose of the operation of the system shown in Fig. 3 the worm gear 9 is substituted for the worm gear 39. The adjusting yoke and cam follower are inoperative when the worm gear 9 is in action. In connection with the worm gear 9 the turning is accomplished at the same speed up to the cutaway segment 11 at which time the turning moment exerted by the eccentric force of the jet through the offset main nozzle 34 causes the nozzle and the nozzle conduit 33 to turn quickly around the toothless segment 11 of the worm gear 9 until the worm 49 reengages the other end of the blank or toothless segment 11 and the controlled operation for intermittent turning begins again as heretofore described.

The aforesaid controlled sprinkler mechanism eminently adapts itself to a system of series irrigation of large areas providing even precipitation over entire fields and has proved itself, as used in said system, a highly efficient and economical method of surface irrigation by sprinklers. The system, the method and the device are simple in construction, do not require any adjustment and automatically accomplish the uniform irrigation once they are set up and shifted at intervals as heretofore described. The main supply pipe or line may be underground with suitably spaced outlets in which case the conduit section assemblies can be drawn as a unit from one outlet to another and shifted and rearranged in the manner described. The entire system may be made portable by having the supply line of light material on the surface and then shifting the supply line with the sectional conduit assemblies thereon to the respective locations and sides in the fields.

I claim:

1. In an irrigation system by sprinklers the steps of arranging the sprinklers in series, turning the sprinklers by intermittent movement to sprinkle a substantially circular area, spacing the centers of rotation of said sprinklers in said series at a distance about equal to the radius of the circle of sprinkling by a sprinkler, and varying the speed of turning of said sprinklers during each revolution at the overlapping portions of the circles of sprinkling, so as to compensate for the differences in water discharge at various portions of said circles.

2. In an irrigation system by sprinklers the steps of arranging the sprinklers in series, turning the sprinklers by intermittent movement to sprinkle a substantially circular area, spacing the centers of rotation of said sprinklers in said series at a distance about equal to the radius of the circle of sprinkling by a sprinkler, and varying the speed of intermittent rotating movements of said sprinklers during each revolution so as to discharge less water over the areas overlapping the adjacent circles of sprinkling than to the areas outside the overlapping sprinkling areas.

3. In a system of sprinkling irrigation, the insertion of sectional piping on a main supply conduit, and the insertion of a shorter sectional piping on said main conduit spaced from the first sectional piping, connecting a rotating sprinkler at the end of each sectional line and sprinkling until each sprinkler discharged a desired amount of water over its circle, then removing from the first sectional line a section substantially of a length equal to the radius of the previously sprinkled area and inserting said removed section into the other sectional line and connecting the respective sprinklers to the modified lines until each sprinkler completed the irrigation of another circular area, and repeating said sequence of steps after each circular area is irrigated until the entire length of the first sectional line is inserted into the second sectional line thus completing the irrigation of both strips along said lines and varying the degree of rotation of each sprinkler during each revolution to compensate for the overlapping of sprinkled areas along each of said sectional lines.

4. In a sprinkler system of the character described, a main conduit, a plurality of detachable sectional branch conduits extended from said main conduit, a conduit stand detachably and interchangeably connected to the end of each sectional conduit, a nozzle device rotatably supported on each stand to sprinkle a generally circular area, means actuated by a stream of water from said nozzle device for rotating said nozzle at a predetermined rate of speed, and a mechanism coacting with said rotating means to vary the rate of rotating movement during each revolution so as to vary the rate of sprinkling according to the overlapping of the adjacent areas sprinkled by said sprinklers.

5. In a sprinkling device of the character described, a conduit stand adapted to be attached to a conduit, a nozzle conduit rotatably held on and in communication with said conduit, means on said nozzle conduit to sprinkle over a circular area as said nozzle conduit is rotated, and a mechanism to rotate said nozzle conduit and said sprinkling means comprising a support frame connected to said nozzle conduit, a bucket member oscillatably supported in said frame, an auxiliary nozzle leading from said nozzle conduit to said frame and discharging a stream of water generally tangentially to said oscillating member, an element to direct said stream from said auxiliary nozzle into said bucket member so as to force said bucket member from an initial position in one direction, means to render said element inoperative after said bucket member is moved in said direction and to release said auxiliary nozzle stream for sprinkling, restricted means to drain the water from said bucket member during a predetermined period, means to return the emptied bucket member to its initial position, means actuated by the returning of said bucket member to render said stream directing element operative, and coacting transmission devices on said stand and on said mechanism operated by said bucket member oscillation to convert the oscillation of said bucket member into turning movement of said nozzle conduit.

6. In a sprinkling device of the character described, a conduit stand adapted to be attached to a conduit, a nozzle conduit rotatably held on and in communication with said conduit, means on said nozzle conduit to sprinkle over a circular area as said nozzle conduit is rotated, and a mechanism to rotate said nozzle conduit and said sprinkling means comprising a support frame connected to said nozzle conduit, a bucket member oscillatably supported in said frame, an auxiliary nozzle leading from said nozzle conduit to said frame and discharging a stream of water generally tangentially to said oscillating element, an element to direct said stream from said auxiliary nozzle into said bucket member so as to force said bucket member from an initial position in one direction, means to render said element inoperative after said bucket member is moved in said direction and to release said auxiliary nozzle stream for sprinkling, restricted means to drain the water from said bucket member during a predetermined period, means to return the emptied bucket member to its initial position, means actuated by the returning of said bucket to render said stream directing element operative, and coacting transmission devices on said stand and on said mechanism operated by said bucket member oscillation to convert the oscillation of said bucket member into turning movement of said nozzle conduit, and means to vary the degree of said turning movement according to a predetermined pattern throughout each rotation of said nozzle conduit.

7. In a sprinkling nozzle of the character described, a conduit stand, a nozzle conduit journalled in said stand, nozzle means on said nozzle conduit to sprinkle a generally circular area as the nozzle conduit is rotated, a mechanism to rotate said nozzle conduit by the force of a stream of water comprising a support member fixedly connected to the nozzle conduit, a bucket member journalled in said support member for oscillation on an arcuate path, an auxiliary nozzle adapted to issue a stream of water generally tangentially to said arcuate path, said bucket member having an intake opening facing toward said stream of water and having a restricted outlet, a movable stream guiding element opposite the outlet of said auxiliary nozzle for directing the stream of water from said nozzle toward said intake opening for oscillating said bucket member from its initial position on said arcuate path beyond the center of the arc of oscillation, means to return said bucket member to its initial position after the water is drained therefrom through said restricted outlet, means actuated by the oscillation of said bucket member to move said stream guiding element out of the way of said nozzle stream when said bucket is moved from its initial position and to return said stream guiding element to its initial position when said bucket member is returned to its initial position, said auxiliary nozzle stream being freed for sprinkling when said stream guiding element is in the out of way position, and means to convert each oscillation of said bucket member into turning movement of said nozzle conduit relatively to said stand.

8. In a sprinkling nozzle of the character described, a conduit stand, a nozzle conduit journalled in said stand, nozzle means on said nozzle conduit to sprinkle a generally circular area as the nozzle conduit is rotated, a mechanism to rotate said nozzle conduit by the force of a stream of water comprising a support member fixedly connected to the nozzle conduit, a bucket member journalled in said support member for oscillation on an arcuate path, an auxiliary nozzle adapted to issue a stream of water generally tangentially to said arcuate path, said bucket member having an intake opening facing toward said stream of water and having a restricted outlet, a movable stream guiding element opposite the outlet of said auxiliary nozzle for directing the stream of water from said nozzle toward said intake opening for oscillating said bucket member from its initial position on said arcuate path beyond the center of the arc of oscillation, means to return said bucket member to its initial position after the water is drained therefrom through said restricted outlet, means actuated by the oscillation of said bucket member to move said stream guiding element out of the way of said nozzle stream when said bucket is moved from its initial position and to return said stream guiding element to its initial position when said bucket member is returned to its initial position, said auxiliary nozzle stream being freed for sprinkling when said stream guiding element is in the out of way position, and means to convert each oscillation of said bucket member into turning movement of said nozzle conduit relatively to said stand, said converting means including a worm rotatably supported on said support member, means actuated by each oscillation of the bucket member to turn said worm, and a gear fixed on said stand and engaged by said worm so that said worm rides on said fixed gear and carries said rotating mechanism therewith every time said worm is turned.

9. In a sprinkling nozzle of the character described, a conduit stand, a nozzle conduit journalled in said stand, nozzle means on said nozzle conduit to sprinkle a generally circular area as the nozzle conduit is rotated, a mechanism to rotate said nozzle conduit by the force of a stream of water comprising a support member fixedly connected to the nozzle conduit, a bucket member journalled in said support member for oscillation on an arcuate path, an auxiliary nozzle adapted to issue a stream of water generally tangentially to said arcuate path, said bucket member having an intake opening facing toward said stream of water and having a restricted outlet, a movable stream guiding element opposite the outlet of said auxiliary nozzle for directing the stream of water from said nozzle toward said intake opening for oscillating said bucket member from its initial position on said arcuate path beyond the center of the arc of oscillation, means to return said bucket member to its initial position after the water is drained therefrom through said restricted outlet, means actuated by the oscillation of said bucket member to move said stream guiding element out of the way of said nozzle stream when said bucket is moved from its initial position and to return said stream guiding element to its initial position when said bucket member is returned to its initial position, said auxiliary nozzle stream being freed for sprinkling when said stream guiding element is in the out of way position and means to convert each oscillation of said bucket member into turning movement of said nozzle conduit relatively to said stand, said converting means including a worm rotatably supported on said support member, means actuated by each oscillation of the bucket member to turn said worm, and a gear fixed on said stand and engaged by said worm so that said worm rides on said fixed gear and carries said rotating mechanism therewith every time said worm is turned, a segment of said gear being toothless and said nozzle device being eccentric with respect to said stand so as to impart force for skipping said worm and said rotating mechanism over said toothless gear segment thereby to skip said nozzle device over a corresponding sector of said circular area.

10. In a sprinkling nozzle of the character described, a conduit stand, a nozzle conduit journalled in said stand, nozzle means on said nozzle conduit to sprinkle a generally circular area as the nozzle conduit is rotated, a mechanism to rotate said nozzle conduit by the force of a stream of water comprising a support member fixedly connected to the nozzle conduit, a bucket member journalled in said support member for oscillation on an arcuate path, an auxiliary nozzle adapted to issue a stream of water generally tangentially to said arcuate path, said bucket member having an intake opening facing toward said stream of water and having a restricted outlet, a movable stream guiding element opposite the outlet of said auxiliary nozzle for directing the stream of water from said nozzle toward said intake opening for oscillating said bucket member from its initial position on said arcuate path beyond the center of the arc of oscillation, means to return said bucket member to its initial position after the water is drained therefrom through said restricted outlet, means actuated by the oscillation of said bucket member to move said stream guiding element out of the way of said nozzle stream when said bucket is moved from its initial position and to return said stream guiding element to its initial position when said bucket member is returned to its initial position, said auxiliary nozzle stream being freed for sprinkling when said stream guiding element is in the out of way position, and means to convert each oscillation of said bucket member into turning movement of said nozzle conduit relatively to said stand, said converting means including a ratchet and pawl device on said support operated by each oscillation of said bucket member for turning the ratchet, a worm turned by said ratchet, a worm gear fixed on said stand and engaged by said worm so that said worm moves around said gear as it is turned, and connection between the worm and said support to turn said support and said nozzle conduit and nozzle device around said gear with said worm.

11. In a sprinkling nozzle of the character described, a conduit stand, a nozzle conduit journalled in said stand, nozzle means on said nozzle conduit to sprinkle a generally circular area as the nozzle conduit is rotated, a mechanism to rotate said nozzle conduit by the force of a stream of water comprising a support member fixedly connected to the nozzle conduit, a bucket member journalled in said support member for oscillation on an arcuate path, an auxiliary nozzle adapted to issue a stream of water generally tangentially to said arcuate path, said bucket member having an intake opening facing toward said stream of water and having a restricted outlet, a movable stream guiding element opposite the outlet of said auxiliary nozzle for directing the stream of water from said nozzle toward said intake opening for oscillating said bucket member from its initial position on said arcuate path beyond the center of the arc of oscillation, means to return said bucket member to its initial position after the water is drained therefrom through said restricted outlet, means actuated by the oscillation of said bucket member to move said stream guiding element out of the way of said nozzle stream when said bucket is moved from its initial position and to return said stream guiding element to its initial position when said bucket member is returned to its initial position, said auxiliary nozzle stream being freed for sprinkling when said stream guiding element is in the out of way position, and means to convert each oscillation of said bucket member into turning movement of said nozzle conduit relatively to said stand, said converting means including a ratchet and pawl device on said support operated by each oscillation of said bucket member for turning the ratchet, a worm turned by said ratchet, a worm gear fixed on said stand and engaged by said worm so that said worm moves around said gear as it is turned, and connection between the worm and said support to turn said support and said nozzle conduit and nozzle device around said gear with said worm, and means to vary the stroke of said pawl in a predetermined pattern during each circle of movement of said support and nozzle means about said gear.

12. In a sprinkling device of the character described a conduit stand, a nozzle conduit journalled in said stand, at least one nozzle on said nozzle conduit to sprinkle a generally circular area as the nozzle conduit is rotated, an auxiliary nozzle conduit extended from and along said first nozzle conduit, a housing fixedly mounted on said first nozzle conduit, an oscillating element journalled in said housing, a bucket formed generally peripherally on said oscillating element, said housing having an opening on a side thereof, an auxiliary nozzle conduit extended from said first nozzle conduit to said housing opening, an auxiliary nozzle on said auxiliary nozzle conduit adapted to sprinkle into said circular area, said bucket having an intake port peripherally facing toward said auxiliary nozzle and a restricted outlet port spaced from said intake port, a fixed peripheral guide in said housing spaced from said auxiliary nozzle and extended to said intake port in the initial empty position of said bucket, a movable stream guide between said fixed guide and said auxiliary nozzle to direct the stream from said auxiliary nozzle to said fixed guide so as to force said bucket and said oscillating element to move an initial stroke of oscillation as the bucket is filled, means to urge said bucket and oscillating element to return to said initial position after said bucket is emptied through said outlet opening, a device actuated by said initial stroke of oscillation of said bucket to move said movable guide out of the way of said auxiliary nozzle stream and actuated by the return stroke of said oscillation of said bucket to return said movable guide in the path of said auxiliary nozzle stream, and coacting transmission means in said housing and on said stand actuated by each oscillation of said oscillating element to convert each oscillation into turning movement of said housing and said nozzle conduits about said stand.

13. In a sprinkling device of the character described a conduit stand, a nozzle conduit journalled in said stand, at least one nozzle on said nozzle conduit to sprinkle a generally circular area as the nozzle conduit is rotated, an auxiliary nozzle conduit extended from and along said first nozzle conduit, a housing fixedly mounted on said first nozzle conduit, an oscillating element journalled in said housing, a bucket formed generally peripherally on said oscillating element, said housing having an opening on a side thereof, an auxiliary nozzle conduit extended from said first nozzle conduit to said housing opening, an auxiliary nozzle on said auxiliary nozzle conduit adapted to sprinkle into said circular area, said bucket having an intake port peripherally facing toward said auxiliary nozzle and a restricted outlet port spaced from said intake port, a fixed peripheral guide in said housing spaced from said auxiliary nozzle and extended to said intake port in the initial empty position of said bucket, a movable stream guide between said fixed guide and said auxiliary nozzle to direct the stream from said auxiliary nozzle to said fixed guide so as to force said bucket and said oscillating element to move an initial stroke of oscillation as the bucket is filled, means to urge said bucket and oscillating element to return to said initial position after said bucket is emptied through said outlet opening, a device actuated by said initial stroke of oscillation of said bucket to move said movable guide out of the way of said auxiliary nozzle stream and actuated by the return stroke of said oscillation of said bucket to return said movable guide in the path of said auxiliary nozzle stream, and coacting transmission means in said housing and on said stand actuated by each oscillation of said oscillating element to convert each oscillation into turning movement of said housing and said nozzle conduits about said stand, and means to vary the degree of turning for the respective oscillations during each complete rotation of said nozzle conduit for varying the precipitation by said nozzles at selected sectors of said circular area.

References Cited in the file of this patent

UNITED STATES PATENTS

| | | |
|---|---|---|
| 935,587 | Casey | Sept. 28, 1909 |
| 1,112,271 | Demuth | Sept. 29, 1914 |
| 1,430,620 | Brauer | Oct. 3, 1922 |
| 1,730,623 | Orr | Oct. 8, 1929 |
| 2,034,515 | Hubbell | Mar. 17, 1936 |
| 2,069,150 | Holder | Jan. 26, 1937 |
| 2,120,784 | Howald | June 14, 1938 |
| 2,376,007 | Quigley | May 15, 1945 |
| 2,659,626 | Landry | Nov. 17, 1953 |

FOREIGN PATENTS

| | | |
|---|---|---|
| 199,697 | Great Britain | Jan. 3, 1924 |
| 620,177 | Germany | Oct. 14, 1935 |